United States Patent Office 3,778,282
Patented Dec. 11, 1973

3,778,282
PIGMENTARY COMPOSITIONS, THEIR PREPARATION AND THEIR APPLICATIONS TO THE COLOURATION IN BULK OF CELLULOSE ESTERS
Francis Rene Daniel Manier, Villemomble, France, assignor to Ugine Kuhlmann, Paris, France
No Drawing. Filed Mar. 23, 1971, Ser. No. 127,400
Claims priority, application France, Mar. 25, 1970, 7010704
Int. Cl. C08b *21/04, 27/28, 27/38*
U.S. Cl. 106—187     15 Claims

ABSTRACT OF THE DISCLOSURE

Pigmentary composition comprising:

(a) at least one colouring matter insoluble in water and in the organic solvents used for spinning fibres based on cellulosic esters, (b) a non-ionic surface-active substance insoluble in water, but soluble in the organic solvents used for spinning fibres based on cellulosic esters, in an amount B of between 1% and 10% inclusive, of the weight (A) of the colouring matter, and (c) A cellulosic ester in an amount C such that the ratio $$\frac{A \times 100}{A+B+C}$$

is between 20 and 95 inclusive.

The pigmentary composition may be prepared by a process wherein (a) On the one hand zinc chloride, and on the other hand a cellulosic ester, are introduced into an aqueous dispersion of the water-insoluble colouring matter and the non-ionic surface-active substance, the amounts of colouring matter (A), water (A'), non-ionic surface-active substance (B), cellulosic ester (C) and zinc chloride (D) used being such that the following relations are satisfied:

$$20 \leq \frac{A \times 100}{A+B+C} \leq 95$$

$$0.01 \leq B \leq \frac{A}{10}$$

$$55 \leq \frac{D \times 100}{A'+D} \leq 70$$

then (b) the mixture is diluted with water until the ratio:

$$\frac{\text{Weight of zinc chloride}}{\text{Weight of water}+\text{weight of zinc chloride}}$$

becomes equal to or less than 0.4, and (c) the precipitate thus obtained is isolated. The pigmentary composition is useful for the colouration of bulk cellulosic esters.

The present invention concerns pigmentary compositions, their preparation and their applications to the colouration in bulk of cellulosic esters.

The colouration of artificial fibres based on cellulosic esters such as cellulose diacetate or triacetate is effected, according to a known process, by incorporating in the bulk spinning material of these fibres colouring matters in a pigmentary form which are stable in the organic solvents (such as, for example, acetone or methylene chloride) normally used to dissolve the cellulosic esters. After spinning the solvent is mostly removed by evaporation. The elimination of the dissolving agent must not cause that of the pigment, whatever the process.

In order to obtain normal working of the spinning equipment and a uniform colouration of the fibres, it is necessary to have available pigments, the distribution of which in the bulk spinning material takes place homogeneously and in a very finely divided state. If this condition is not complied with, the very fine orifices in the spinnerets become blocked. On the other hand, the presence of large pigment particles in the midst of the fibres greatly reduces their dynamometric characteristics and often considerably modifies the appearance of their colouration, which no longer appears homogeneous.

The same problem also arises with equal acuteness when it is desired to obtain coatings or thin films from cellulosic ester solutions.

In order to obtain good results which are perfectly reproducible, it is possible, for example, to grind the pigment in a liquid which is compatible with the dissolving medium or even directly in a portion of this medium. The pigment can also be ground directly in a part of the bulk spinning material. These processes enable a very effective grinding of the pigments to be effected and very small particle dimensions to be obtained, thus allowing a homogeneous distribution of the pigment particles in the bulk spinning material. However, these good results are only obtained by using considerable mechanical forces for the grinding for sometimes very long times.

According to the present invention pigmentary compositions are provided comprising (a) at least one colouring matter which is insoluble in water and in the organic solvents used for spinning fibres based on cellulosic esters, (b) a non-ionic surface-active substance which is insoluble in water, but soluble in the organic solvents used for spinning the fibres based on cellulosic esters, in an amount B of between 1% and 10% inclusive, preferably between 2% and 6% inclusive, of the weight (A) of the colouring material, and (c) a cellulosic ester in an amount C such that the ratio $$\frac{A \times 100}{A+B+C}$$

is between 20 and 95 inclusive, preferably between 50 and 95 inclusive.

The non-ionic surface-active substance and the cellulosic ester form a coating on the surface of the particles of colouring matter and by means of this invention the disadvantages set out above are avoided.

The colouring matters defined under (a) and for the sake of convenience hereinafter called "pigments" in the body of the specification may be mineral pigments such as, for example, carbon black and titanium dioxide or organic pigments. In the latter case they may belong to a great diversity of classes such as, for example, azo, azomethine, anthraquinone, phthalocyanine and indigo.

Examples of non-ionic surface-active substances which may be used for the preparation of compositions according to the invention are water-insoluble products of addition of ethylene oxide on fatty alcohols or alkylphenols, for example, the product resulting from the addition of 4 moles of ethylene oxide to one mole of oleyl alcohol or that resulting from the addition of 8 moles of ethylene oxide to one mole of nonylphenol, water-insoluble polyalkylene glycols or ethers of polyalkylene glycols of viscosity between 10 and 470 centistokes include measured at 37.8° C., compounds of the general formula:

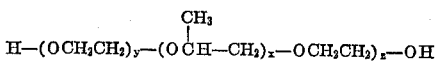

in which $x$ represents a whole number above 20 and the sum $y+z$ is such that the content of $(OCH_2CH_2)$ groups is less than or equal to 10% of the total molecular weight, and compounds of the general formula:

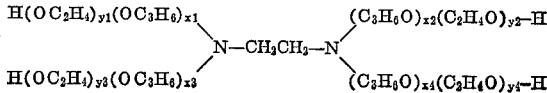

in which the sum of the $x$ numbers represents a whole number greater than 16 and the sum of the $y$ numbers is such that the content of $(OC_2H_4)$ groups is less than 10% of the total molecular weight.

Cellulose diacetate and cellulose triacetate may be mentioned more particularly as cellulosic esters. By cellulose diacetate is meant the acetic esters of cellulose of which the average amount of acetylation is from $\frac{4}{6}$ to $\frac{5}{6}$ of the theoretical maximum. For cellulose triacetate, the average amount of acetylation is very near to the theoretical maximum.

It is preferred in the composition of this invention that the greater part of the colouring matter be in the form of particles of particle dimension near to or less than 1 micron.

The pigmentary compositions according to the invention may be advantageously prepared as follows:

Zinc chloride on the one hand, and a cellulose ester on the other hand, are introduced into an aqueous dispersion of pigment and non-ionic surface active substance, and the mixture is then diluted with water until the ratio $$\frac{\text{Weight of zinc chloride}}{\text{Weight of water} + \text{weight of zinc chloride}}$$

becomes equal to or less than 0.4.

In the first stage of the process, quantities of pigment (A), water (A'), surface-active non-ionic substance (B), cellulose ester (C) and zinc chloride (D) are used such that the following relations may be satisfied:

(1) $$20 \leq \frac{A \times 100}{A+B+C} \leq 95$$

(2) $$\frac{A}{100} \leq B \leq \frac{A}{10}$$

(3) $$55 \leq \frac{D \times 100}{A'+D} \leq 70$$

The first stage of the process of the invention may be effected, for example, by kneading an aqueous paste of pigment such as is obtained during the manufacture of the pigment, with the zinc chloride and the non-ionic surface-active substance and subsequent solution of the cellulose ester in the mixture thus obtained. Since the solution of the zinc chloride in the water is exothermic, the temperature of the mixture may rise to around 40° C., without this having any adverse effect on the development of the later operations.

Instead of using as the primary starting material a pressed pigmentary paste, it is possible to use the pigment in the powdered state. It is then necessary to replace the kneading by a grinding in an aqueous medium, for example in a sand, bead or roller grinder. In this case, the operation is preferably effected with quantities A, A' and B such that:

$$10 \leq \frac{A \times 100}{A+A'+B} \leq 30$$

If desired, the cellulose ester may be added first and the zinc chloride then dissolved.

After diluting the mixture with water according to the second stage of the process, the precipitated product may be isolated, washed, dried, and if desired pulverised.

The pigmentary compositions according to the invention thus obtained are very easily distributed in the solutions of cellulose esters used for spinning fibres or filaments or the formation of thin films.

A simple agitation is sufficient to obtain a complete solution of the coating and consequently a homogeneous distribution of pigments in a finely divided state within the mass intended for spinning or for the formation of films. The spinning and the formation of films may take place according to the usual known methods; the pigmentary compositions according to the invention, alone or mixed with one another, enable pure shades and an excellent tinctorial yield to be obtained. The compositions of the invention prepared from titanium dioxide may be used as delustering agents if it is desired to abolish the glossy look of fibres.

The pigmentary compositions according to the invention, especially those based on pigments resistant to high temperatures, can also be used to colour bulk plastics based on cellulosic esters of which the shaping ie effected at high temperature, most often between 150° C. and 200° C. by moulding, pressing, calendering or extrusion, possibly in the presence of plasticising agents.

The following examples, in which the parts indicated are parts by weight unless the contrary is stated, illustrate the invention without restricting it.

EXAMPLE 1

100 parts of a pressed paste containing 70% of water and 30% of colouring matter C.I. Pigment Yellow 49, 95.5 parts of zinc chloride and 1.5 parts of the condensation product of one mole of nonylphenol with 8 moles of ethylene oxide are intimately mixed in a mixer of the "Werner" type. When the mixture is homogeneous, 3.8 parts of cellulose diacetate are added and mixing is effected until the cellulose diacetate is completely dissolved. Then 73 parts of water are added. The cellulose diacetate precipitates white coating the pigment particles and entraining the surface-active substance. The pigment composition is filtered off, washed with tepid water until the zinc chloride is completely eliminated, dried and pulverised. A non-dusty powder containing 85% of yellow pigment is thus obtained, which may be distributed homogeneously by simple agitation in solutions of cellulose esters.

EXAMPLE 2

The operation is as in Example 1, but the cellulose diacetate is replaced by cellulose triacetate and the colouring matter by chlorinated copper phthalocyanine. A product containing 85% of chlorinated copper phthalocyanine is obtained which is readily dispersible in cellulosic solutions which it colours in a homogeneous green shade.

EXAMPLE 3

20 parts of the powdered colouring matter C.I. Pigment Red 112, 0.8 part of the surface-active substance used in Example 1, 80 parts of water and 109 parts of dry zinc chloride are ground in a sand or bead grinder until the average size of the particles is about 1 micron. 7.76 parts of cellulose diacetate are dissolved in the mixture, then the mixture is separated from the grinding elements, 83.5 parts of water are added to the mixture, and the operation is completed as in Example 1. A product is thus obtained which contains 70% of red pigment which is readily distributed by agitation in cellulosic masses which it colours uniformly.

EXAMPLE 4

The operation is as in Example 3, but the cellulose diacetate is replaced by cellulose triacetate and the colouring matter is replaced by 20 parts of $\beta$ copper phthalocyanine.

The following table summarises other examples of pigmentary compositions according to the invention, prepared according to the preceding examples from the pigment indicated in the second column, the cellulose ester indicated in the third column and the surface-active substance used in Example 1.

| Ex. | Pigment used | Cellulose ester | Percent of pigment in the final composition |
|---|---|---|---|
| 5 | C.I. Pigment Yellow 13 | Diacetate | 90 |
| 6 | C.I. Vat Red 1 | do | 85 |
| 7 | Titanium dioxide | do | 70 |
| 8 | Copper phthalocyanine | do | 80 |
| 9 | C.I. Pigment Red 17 | do | 80 |
| 10 | C.I. Vat Orange 15 | do | 75 |
| 11 | C.I. Vat Orange 3 | do | 55 |
| 12 | C.I. Vat Orange 7 | do | 85 |
| 13 | C.I. Pigment Yellow 16 | do | 90 |
| 14 | C.I. Vat Violet 3 | do | 50 |
| 15 | C.I. Vat Blue 21 | do | 92.5 |
| 16 | C.I. Vat Blue 4 | do | 40 |
| 17 | C.I. Vat Green 2 | do | 75 |
| 18 | C.I. Vat Green 3 | do | 75 |
| 19 | C.I. Vat Brown 5 | do | 80 |
| 20 | C.I. Pigment Red 17 | do | 75 |
| 21 | C.I. Pigment Orange 22 | do | 60 |
| 22 | (1) | do | 45 |
| 23 | (2) | do | 90 |
| 24 | Copper phthalocyanine | Triacetate | 80 |
| 25 | Chlorinated copper phthalocyanine | do | 80 |
| 26 | C.I. Vat Yellow 1 | do | 85 |
| 27 | Carbon black | do | 80 |
| 28 | Titanium dioxide | do | 70 |

1 4'-nitro-2'-methoxy-1-phenylazo-2-hydroxy-3-(α)naphthylamino-carbonylnaphthalene.
2 5'-methyl-4'-benzoylamino-2'-methoxy-1-phenylazo-2-hydroxy-3-(4-chloro-2-methyl)-phenylaminocarbonylnaphthalene.

EXAMPLE 29

The operation is as in Example 3, but the surface-active substance used is replaced by the product of addition of 4 moles of ethylene glycol oxide to one mole of a polypropylene glycol of average molecular weight 1750.

EXAMPLE 30

85 parts of acetone, 15 parts of cellulose diacetate and 0.133 part of the pigmentary composition described in Example 5 are placed in a receiver, then the mixture is subjected to slow agitation so as to distribute uniformly the solubilised diacetate. After degassing under vacuum, the mixture is introduced into the receiver under pressure feeding the duty pump of a conventional apparatus for dry spinning.

Continuous filaments with a deep and glossy bright yellow shade are thus obtained.

A detailed microscopic examination of the fibres shows that the pigment particles are very finely distributed and that their average dimension is less than a micron. On the other hand, the dynamometric characteristics of the coloured fibres obtained are not modified by the presence of the particles.

If on the other hand, the operation is carried out with the same crude non-coated pigment, it is very difficult to obtain a normal functioning of the spinning apparatus because of large particles of pigment which often exceed 15 to 20 microns progressively clogging the protecting filters of the spinneret; consequently the regularity of the titre of the filament is no longer ensured and its colouration is not uniform.

EXAMPLE 31

85 parts of acetone, 15 parts of cellulose diacetate, 1.35 parts of the pigmentary composition described in Example 9 and 0.67 part of the pigmentary composition described in Example 8 are admixed. After complete solution of the diacetate, 1 part of this mixture is introduced into 9 parts of a 15% solution of cellulose diacetate in acetone. After spinning by the usual process, filaments of a full-bodied and uniform violet shade are obtained.

EXAMPLE 32

80 parts of acetone and 20 parts of the pigmentary composition described in Example 13 are admixed.
Then by means of a dosing pump and a homogenising apparatus, 1.33 parts of this parent dispersion are introduced into 100 parts of a 20% spinning solution of cellulose diacetate in acetone. After spinning, fibres coloured a bright full-bodied yellow shade are obtained.

I claim:

1. Process for the preparation of a pigmentary composition wherein:
   (a) on the one hand zinc chloride, and on the other hand a cellulose acetate are introduced into an aqueous dispersion of a colouring matter which is insoluble in water, acetone and methylene chloride, and of a non-ionic surface-active substance, which is insoluble in water, but soluble in acetone and methylene chloride, wherein the non-ionic surface active substance is, (1) a water-insoluble product of addition of ethylene oxide to a fatty alcohol or an alkylphenol; (2) a water-insoluble polyalkylene glycol of viscosity between 10 and 470 centistokes inclusive measured at 37.8° C.; (3) a compound of the general formula:

$$H-(OCH_2CH_2)_y-\left(\underset{\underset{CH_3}{|}}{O CH-CH_2}\right)_x-(OCH_2CH_2)_z-OH$$

in which $x$ represents a whole number greater than 20 and the sum $y + z$ is such that the content of $(OCH_2CH_2)$ groups is less than or equal to 10% of the total molecular weight, (d) a compound of the general formula:

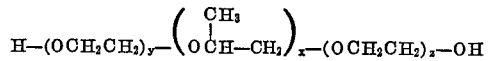
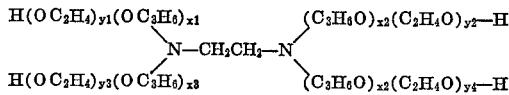

in which the sum of the $x$ numbers represents a whole number greater than 16 and the sum of the $y$ numbers in such that the content of $(OC_2H_4)$ groups is less than 10% of the total molecular weight, the amounts of colouring matter (A), water (A'), non-ionic surface-active substance (B), cellulose acetate (C) and zinc chloride (D) used being such that the following relations are satisfied:

$$20 \leq \frac{A \times 100}{A+B+C} \leq 95$$

$$\frac{A}{100} \leq B \leq \frac{A}{10}$$

$$55 \leq \frac{D \times 100}{A'+D} \leq 70$$

then (b) the mixture is diluted with water until the ratio:

$$\frac{\text{Weight of zinc chloride}}{\text{Weight of water + weight of zinc chloride}}$$

becomes equal to or less than 0.4, and
   (c) the precipitate thus obtained is isolated, washed until the zinc chloride is completely eliminated, and dried.

2. Process according to claim 1 wherein the colouring matter is in the form of a pressed aqueous paste.

3. Process according to claim 1 wherein the colouring matter is in the form of a powder and grinding in aqueous medium is effected.

4. Process according to claim 3 wherein the ratio $$A \times 100/A+A'+B$$

is between 10 and 30 inclusive.

5. Process for the colouration of bulk celleulose acetate wherein a pigmentary composition as claimed in claim 7 is incorporated in the ester.

6. Cellulose acetate coloured in the mass by means of a pigmentary composition according to claim 7.

7. Pigmentary composition consisting of:
   (a) a colouring matter insoluble in water, acetone and methylene chloride,
   (b) a non-ionic surface-active substance insoluble in water, soluble in acetone and methylene chloride, said substance being present in an amount B of between 1% and 10% inclusive of the weight (A) of the colouring matter, and (c) a cellulose acetate in an amount C such that the ratio $$A \times 100/A+B+C$$

is between 20 and 95 inclusive, said pigmentary composition being obtained by the process of claim 1.

8. Pigmentary composition according to claim 7 wherein the amount B is between 2% and 6% inclusive.

9. Pigmentary composition according to claim 7 wherein the ratio $$A \times 100/A+B+C$$

is between 50 and 95 inclusive.

10. Pigmentary composition according to claim 7 wherein the colouring matter is an organic pigment of the azo, azomethine anthraquinone, phathalocyanine or indigo series.

11. Pigmentary composition according to claim 7 wherein the colouring matter is a mineral pigment.

12. Pigmentary composition according to claim 7 wherein the non-ionic surface-active substance is (a) a water-insoluble product of addition of ethylene oxide to a fatty alcohol or an alkylphenol, (b) a water-insoluble polyalkylene glycol or ether of a polyalkylene glycol of viscosity between 10 and 470 centistokes inclusive measured at 37.8° C., (c) a compound of the general formula:

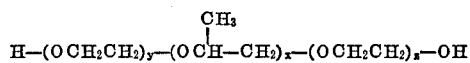

in which $x$ represents a whole number greater than 20 and the sum $y + z$ is such that the content of $(OCH_2CH_2)$ groups is less than or equal to 10% of the total molecular weight, (d) a compound of the general formula:

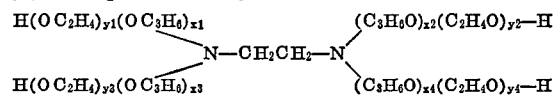

in which the sum of the $x$ numbers represents a whole number greater than 16 and the sum of the $y$ numbers is such that the content of $(OC_2H_4)$ groups is less than 10% of the total molecular weight.

13. Pigmentary composition according to claim 7 wherein the cellulose acetate is cellulose diacetate.

14. Pigmentary composition according to claim 7 wherein the cellulose acetate is cellulose triacetate.

15. Pigmentary composition according to claim 7 wherein the greater part of the colouring matter is in the form of particles of particle dimension near to or less than 1 micron.

References Cited
UNITED STATES PATENTS

| | | | |
|---|---|---|---|
| 2,649,382 | 8/1953 | Vesce | 260—41 R |
| 2,942,997 | 6/1960 | Bram | 106—308 Q |
| 3,513,000 | 5/1970 | Vrancken | 106—31 |
| 3,353,974 | 11/1967 | Trimble | 106—31 |

THEODORE MORRIS, Primary Examiner

U.S. Cl. X.R.

106—190, 193 D, 194, 198, 204